Nov. 1, 1932.  P. VIRY  1,885,966
AUTOMATIC ROTARY MACHINE HEATING BY INDUCTION
Filed Dec. 4, 1928  3 Sheets-Sheet 1
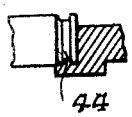
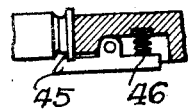
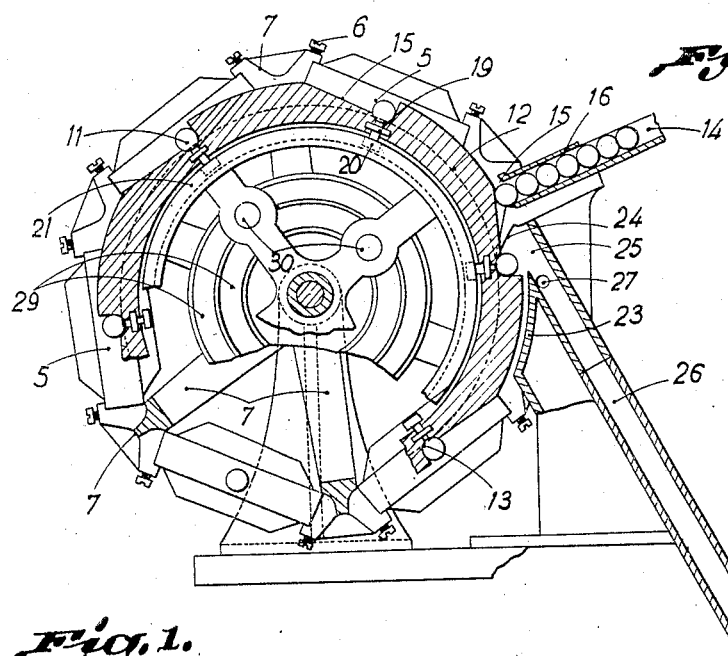
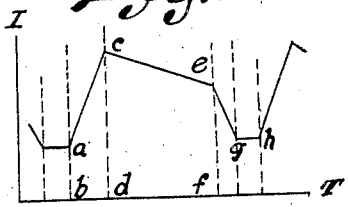
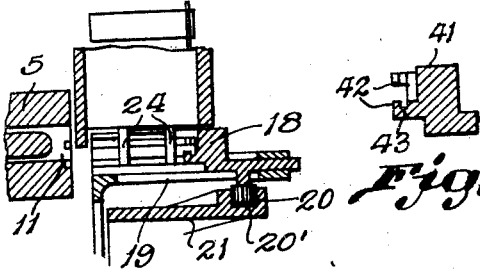
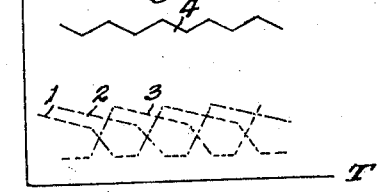
P. Viry INVENTOR
By: Marks & Clerk Attys.

Nov. 1, 1932.  P. VIRY  1,885,966
AUTOMATIC ROTARY MACHINE HEATING BY INDUCTION
Filed Dec. 4, 1928  3 Sheets-Sheet 2
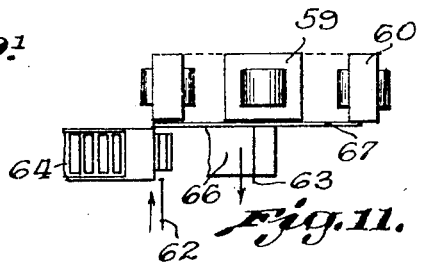
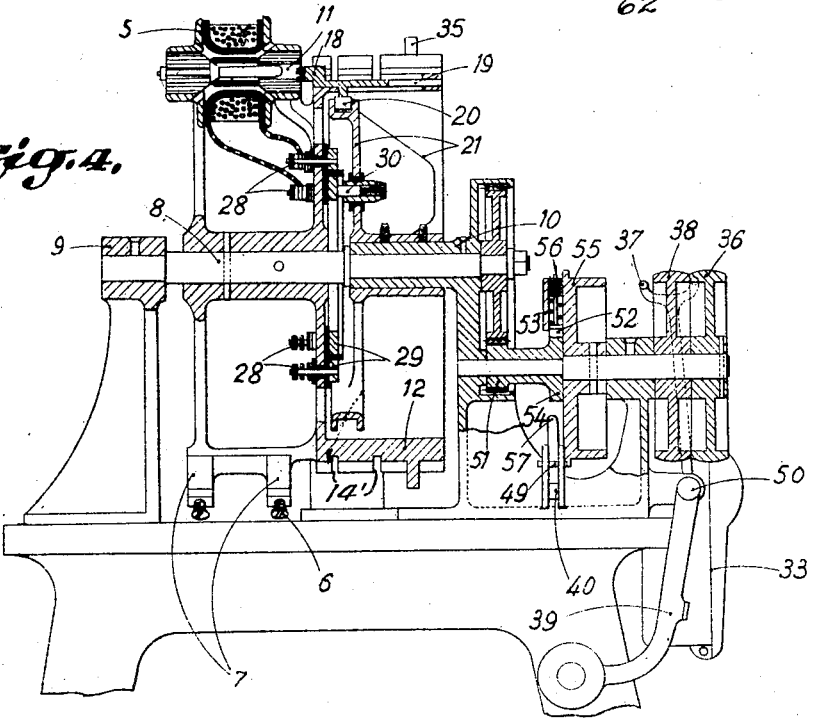
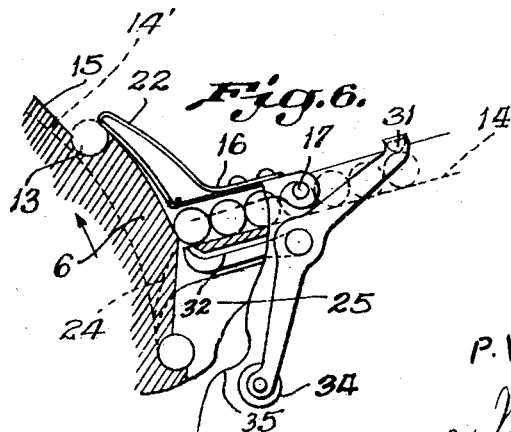
P. Viry INVENTOR Nov. 1, 1932.   P. VIRY   1,885,966
AUTOMATIC ROTARY MACHINE HEATING BY INDUCTION
Filed Dec. 4, 1928   3 Sheets-Sheet 3
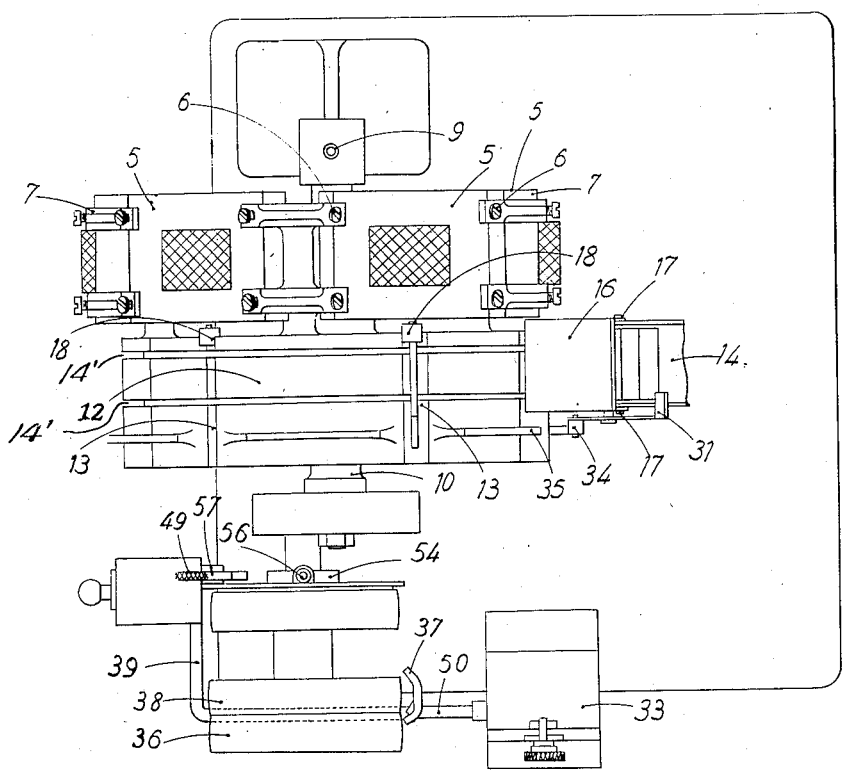
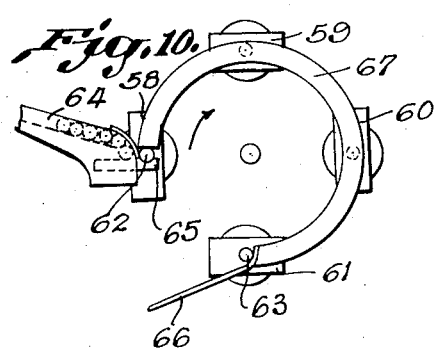
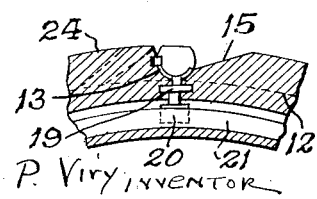

Patented Nov. 1, 1932

1,885,966

UNITED STATES PATENT OFFICE

PIERRE VIRY, OF CHATELLERAULT, FRANCE

AUTOMATIC ROTARY MACHINE HEATING BY INDUCTION

Application filed December 4, 1928, Serial No. 323,710, and in France December 12, 1927.

In the French Patent No. 583.460 of the 4 October 1923 has been already described a process of electric heating by induction, a process which makes it possible to heat locally by induction tubular parts for the purpose of carrying out thermic operations to which is to be submitted the metal of the said parts, and the said patent refers to the combination of induction furnaces utilized for the purpose, with automatic feeding machines, in which the products placed in a feeding conduit, are introduced and withdrawn automatically from the furnaces, owing to which it is possible to obtain a constant intensity of reheating by keeping constant the speed of the machine. The aforesaid patent describes more particularly a machine comprising five furnaces and five conduits, in which the feeding and the withdrawal take place simultaneously in the five furnaces.

The invention is characterized by the fact that the induction furnaces are arranged uniformly on the periphery of a driving wheel, that in their movement of rotation they receive successively, from a single feed conduit, the products to be heated, that the heating takes place during the rotation of the furnaces, and that the products are ejected after heating, towards the end of each revolution of the machine, so that on one hand the beginning of extraction of a product from a furnace coincides with the entrance of a product in the magnetic field of another furnace, and that on the other hand, the sending out from a furnace coincides with the complete sinking of a product in another furnace.

The products are thus heated during the rotation of the furnaces and ejected towards the end of each revolution of the machine. The intensity of heating which is a function of the time of passage of the products through the furnaces, can be therefore regulated by acting on the speed of rotation of the machine. On the other hand, the output, that is to say the number of products heated per hour, is proportional to the number of furnaces mounted on the wheel.

In the accompanying drawings:—

Figure 1 is a diagram showing the variation of current.

Fig. 2 is a similar view showing the current absorbtion.

Fig. 3 is an end view of the device, partly in section.

Fig. 4 is a longitudinal sectional view.

Fig. 5 is a top plan view.

Fig. 6 is a detail view, partly in section, showing the relative arrangement of the buckets and conduit.

Fig. $7^1$ is a detail view of the extractor operating mechanism.

Fig. $7^2$ is a vertical sectional view through Fig. $7^1$.

Fig. $7^3$ is a sectional view of the pusher.

Fig. 8 is a detail view of an extractor provided with a spring.

Fig. $8^1$ is a modified form of pusher.

Fig. $8^2$ is another modified form.

Fig. $8^3$ is an end view of Fig. $8^2$.

Fig. 9 is another form of pusher for use in connection with collarless and grooveless products.

Fig. $9^1$ is an end view of Fig. 9.

Fig. 10 is an end view of a modified form of the invention.

Fig. 11 is a top plan view thereof.

This arrangement offers chiefly the following important advantages:

1. Easy feeding of several furnaces with the assistance of a single feed conduit.
2. Ventilation of the transformer furnaces.
3. Possibility of regularizing the strength of the heating current of the machines.

In fact, in a transformer furnace fed automatically, the strength of current varies in a very irregular manner as a function of time, as diagrammatically illustrated by the curve of variations of Figure 1, in which:

$ab$ is the current in idle state of the transformer, before the introduction of the product into the field;

$cd$ the maximum current when the product reaches its heating position;

$ef$ the current at the end of heating, immediately before the withdrawal or extraction; this current is smaller than the maximum current, owing to the increase of resistance of the product raised to red heat;

*ac* corresponds to the introduction of the product, *ce* to the reheating, *eg* to the withdrawal or extraction, and *gh* to the "dead" time separating the withdrawal of a product and the introduction of the next product.

In a machine comprising several furnaces, the circuits of the furnaces are connected in parallel, and the current absorbed by the machine is the sum of the currents absorbed by the furnace.

Figure 2 which shows the currents absorbed in a machine with three furnaces, and in which the curves 1, 2, 3 represent respectively the strength of the current absorbed by the first, second and third furnace, shows that the currents of each furnace are displaced relatively to one another, and that by regulating the machine in such a manner that, on the one hand, the beginning of the withdrawal or extraction for one furnace coincides with the introduction of the product into the field for another furnace and, on the other hand, the withdrawal from the field for one furnace, coincides with the complete introduction of the product into another furnace, it is possible to regularize the strength of the current absorbed by the machine as indicated by the resultant curve 4. This regularization will be the more perfect, the greater the number of the furnaces.

The machine according to the invention will be more clearly understood with reference to the accompanying drawings in which:

Figures 1 and 2 are the diagrams just mentioned.

Figures 3–9 relate to a rotary machine according to the invention in which the wheel carrying the furnaces, rotates in a uniform and continuous manner, the passage of the product from the fixed conduit to the movable part, their introduction into the furnaces and their extraction from the latter taking place during the movement of the wheel. This construction is particularly well adapted for large outputs.

Figures 10 and 11 show a modified construction of the machine, in which the wheel rotates in an intermittent manner and has stoppages for the introduction and extraction. This construction may be used in certain special cases in which the output is of less importance.

The machine shown in Figures 3–5 comprises six furnaces 5 secured by means of screws 6 between the arms 7 of a wheel, the shaft 8 of which rotates in bearings 9—10. To the said wheel, in front of the inlets or openings 11 of the furnaces, is secured a drum 12 which has on its periphery buckets 13, the axes of which coincide with those of the furnaces. The furnaces 5 are of the type employing iron and magnetic cores.

In their movement of rotation, these buckets pass in front of a distributing conduit 14 in which are arranged the products to be heated. The conduit 14 being inclined, the products to be heated are always pressing against the outer surface of the drum, which surface forms the bottom of the conduit. This surface has in front of each bucket a cam surface 15. In these conditions, the wheel rotating in the direction of the arrows, as shown in Fig. 6, each bucket 13, in passing in front of the conduit 14, takes a product (see Figure 6). A cover 16 which closes like the cover of a snuff box by turning about the hinge pin 17, keeps the products in the conduit. This cover can automatically open if the products are defective or in a wrong position. In getting into the bucket, the product engages with an extractor pusher 18. This organ can move in the direction of the axis of the bucket in guides or slots 19 provided in the drum, and its advance and return movement which brings about the feeding and the ejecting, is transmitted to it by a roller 20 provided on the pusher and rolling in the slot 20′ of a cam 21 securely keyed to the bearing 10. The movement of penetration of the product into the furnace begins as soon as the bucket provided with a product, has passed the conduit. Springs 22 secured to the cover 16, keep the products pressed against the bucket or against the head of the pusher during their introduction into the furnaces.

The arrangement of the extractor-pusher varies according to the shape of the products to be heated.

The arrangement shown in Figures $7^1$, $7^2$, $7^3$ is suitable for the products provided with a collar. The head of the pusher is provided with a kind of cup 41 which receives the tip or spigot of the product, and is provided with two lugs 42 constituting ejectors and provided with grooves 43 with which engages the collar of the product which thus becomes secured to the pusher.

In the event of the product having no collar, but having a groove, the head of the pusher could be modified as shown in Figures $8^1$, $8^2$, $8^3$, so as to be provided, in place of the slots 43, with projections 44 which engage with the said groove.

In such cases could be further utilized also the construction shown in Figure 8, in which a small extractor 45 controlled by a light spring 46, engages with the groove. It follows that the spigot or pip of the product, instead of being supported and held in the head of the pusher 18 constituting a cup, either by the springs 22 during the introduction, or by the part 23 during the extraction (see Figure 6), is held directly in the bucket 13 by the same organs, and the ejector 43, in engagement with the groove, becomes operative only at the moment of the extraction, during the return movement of the pusher.

In the event of the product having neither groove nor collar, could be used the construction shown in Figure 9 in which the pusher 18 is provided with a narrow extension terminating in a hook 47 constituting an extractor.

During the extraction, the part 23 keeps the product in the bucket, in engagement with the extraction organs.

At the moment when the product is completely extracted two wedge-shaped fingers 24 provided in the conduit 14, eject the product from its bucket through the recess 25 of the part 23. These fingers are fixed to the under side of the conduit 14 and engage in the groove 14′ of the drum 12 in order that the products will be dislodged from the bucket as the drum rotates in the direction of the arrow in Fig. 6. The heated products thus ejected, could be directed into an ejection tube 26 which conveys them to a case or box where they are collected. If these products have a pip, it is preferable to bring them into the ejection tube with the pip forward, this being easily ensured by dropping the product horizontally ejected, on a pin 24, placed in a suitable position.

The current is supplied to the transformer furnaces through terminals 28 connected to two rings 29 arranged in a vertical plane. Two fixed brushes 30 mounted on the arms of the cam 21, supply current to the said rings. A quick-break switch 33 makes it possible to cut off the supply of current to the brushes.

The feeding conduit 14 could be filled with products either by hand or by means of an automatic distributor.

Figure 6 shows a device which prevents the conduit, in the event of a stoppage or slackening of the feed, from becoming emptied of its products, being no longer pressed by the column of the following products, would be liable to arrive in a faulty manner. Moreover, the products deposited, having a long way to travel, would be liable to assume a transverse position. Finally, if the conduit became completely empty, a product left in the conduit, could reach the drum at a wrong moment. These drawbacks are avoided by the use of the feeler device shown, which is as follows: at the moment when a cam surface 15 of the drum comes in front of the conduit, a finger 31 secured to two tappets 32, feels the column of products. If it finds there a product, it remains in its raised position, the two tappets 32 remain out of sight, and a product engages with the cam surface and then with the bucket. If on the contrary it does not meet a product, it gets in and the two tappets are raised and stop the feeding. The movement of the finger 31 is controlled by a roller 34 which a spring (not shown) tends to keep in engagement with a cam 35 provided on the drum.

The machine is driven by means of the pulley 36, and the disengaging or striking fork 37 makes it possible to move the driving belt to the loose pulley 38. The striking fork is operated by means of a balance weight lever 39 which is held in the engaged position by the pawl 40. In Figures 4 and 5, this lever 39 is shown in the disengaging position.

The disengaging or striking fork 37 which enables the driving belt to be moved from one pulley to the other is controlled by a spindle 50 which operates also the quick-break switch 33. The spindle 50 is secured to a balance weight lever 39 which can be held in the engaging position by the pawl 40. In these conditions by pressing on the trigger 49, the lever 39 is released, and under the action of its balance weight, turns the spindle 50 which moves the striking fork and operates the switch, thereby producing simultaneously the throwing out of gear and the operation of the switch, thus simultaneously stopping the machine and cutting off the current. Conversely, by raising the lever 39 and holding it against the pawl 40, the machine will be started and heating current sent to the furnaces.

To ensure an automatic throwing out of gear in the case of an abnormal strain, there is provided a strain limiting device which operates the said throwing out of gear in the following manner: the driving pinion 51 of the machine is not keyed to the shaft of the driving pulley 36, but the connection between the said pinion and the shaft is effected by means of a pin 52 pressed by an adjustable spring 53 into a notch provided in a sleeve 54 forming an extension of the pinion. This pin 52 is mounted on a disc 55 keyed to the shaft of the pulley 36. In the event of an abnormal strain being produced, the pin will slide in its notch, and will no longer drive the pinion. Moreover, the end 56 of the pin will come out, and in its movement of rotation will meet the branch 57 of the pawl 40 thus throwing the machine out of gear and cutting off the current.

It will be observed that the member 56 when subjected to abnormal strain engages the branch 57 of the pawl 40, thus releasing lever 39, whereupon the spindle 50 is rotated, the spindle being connected in any suitable manner to a convenient form of current controlling switch. The lever 39 can also be released upon pressing upon the trigger 49, whereupon manual operation of the switch is obtained.

In the modified construction of the heating machine shown in Figures 10 and 11, the furnaces are arranged in the same way as in the first construction, but the drum is done away with, and the movement of the wheel is no longer a continuous one, this wheel stopping in order to allow of the introduction and extraction of the products. It has been assumed by way of example that it was the question of a machine with four furnaces, so that the wheel stops at every quarter of a revolution, which is in the direction of the arrow shown in Fig. 10. There is now only one pusher 62 and one ejector 63. These organs are arranged so that they are at the level of the stop positions of the furnaces, and their movement is conjugated in such a manner that the extractor withdraws when the pusher gets in. The distributions conduit 64 comprises a slide 65 which brings the product at the desired moment in front of the pusher 62. The penetration of the pusher takes place as soon as the wheel has stopped. It will take place for instance in the furnace 58, assuming that in the stop position in question, it is the inlet of the furnace 58 which is in the axis of the pusher. In this position of the wheel, the furnace 61 will be on the level of the extractor, the extraction will take place, and the product will be ejected into the conduit 66. A fixed circular plate 67 arranged in front of the inlets of the furnaces but broken in the part comprised between the extractor and the pusher, keeps the products driven into the furnaces, in spite of the electro-dynamic force which tends to expel them from the same. The extractor could then be done away with, the ejection taking place owing to the said electro-dynamic force as soon as the pip or spigot of the product reaches the end of the plate 67.

In the drawings above described are represented, by way of an example, transformer furnaces, but it will be understood that the invention is not thus limited, and that it relates to furnaces which make use of any secondary currents produced by induction such as secondary current of a transformer, Foucault currents and the like.

Claims:

1. An electric furnace comprising a rotary wheel having a plurality of electric furnaces spacedly arranged on the periphery thereof, a plurality of buckets arranged on said wheel in alinement with the opening of each of said furnaces, a single feed conduit adapted to supply material to each of said buckets upon the rotation of said wheel, means for injecting said material from said buckets into each of said furnaces, means for rotating said wheel, a source of electric supply connected to said electric furnaces, and means for ejecting the heated material from said furnaces.

2. An electric furnace comprising a rotary wheel having a plurality of electric furnaces spacedly arranged on the periphery thereof, a plurality of buckets arranged on said wheel in alinement with the opening of each of said furnaces, a single feed conduit adapted to supply material to each of said buckets upon the rotation of said wheel, a feeler on said feed conduit for preventing the feed conduit from supplying material when the machine is stopped, means for injecting said material from said buckets into each of said furnaces, means for rotating said wheel, a source of electric supply connected to said electric furnaces and means for ejecting the heated material from said furnaces.

3. An electric furnace comprising a rotary wheel having a plurality of electric furnaces spacedly arranged on the periphery thereof, a plurality of buckets arranged on said wheel in alinement with the opening of each of said furnaces, a single feed conduit adapted to supply material to each of said buckets upon the rotation of said wheel, a feeler on said feed conduit for preventing the feed conduit from supplying material when the machine is stopped, means for injecting said material from said buckets into each of said furnaces, means for uniformly and continuously rotating said wheel, a source of electric supply connected to said electric furnaces, and means for ejecting the heated material from said furnaces.

In testimony whereof he has signed this specification.

PIERRE VIRY.